Aug. 22, 1967 M. A. SCHAFFER ET AL 3,336,810
ANTIFRICTION SUPPORT MEANS FOR GYROSCOPES
Filed April 28, 1964 2 Sheets-Sheet 1
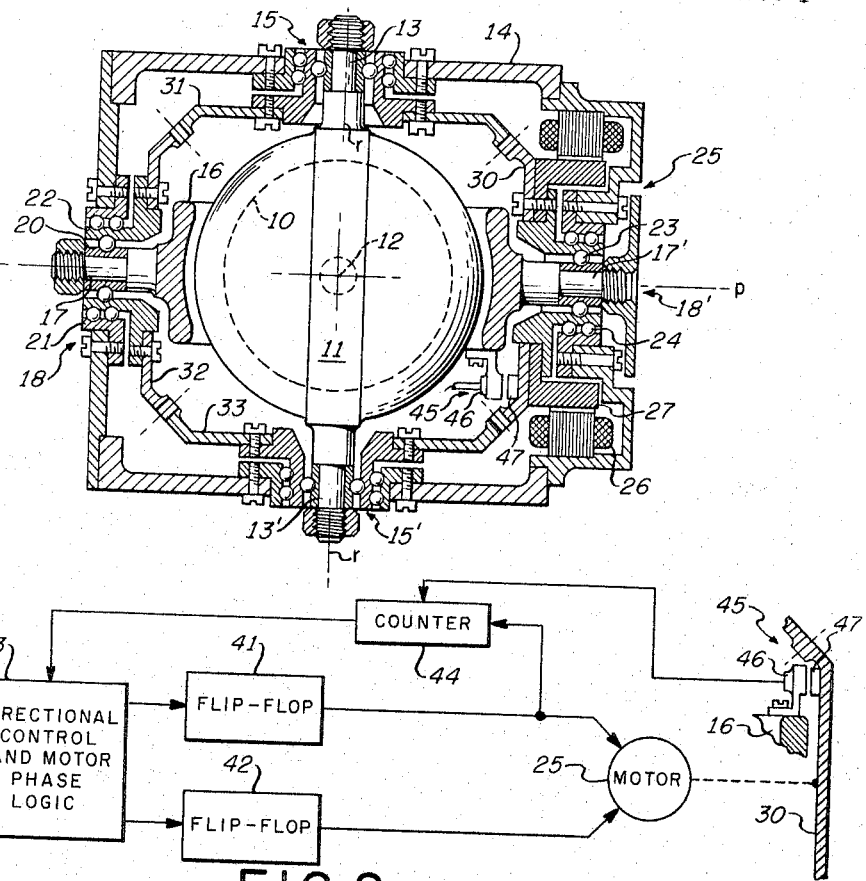
FIG.1.
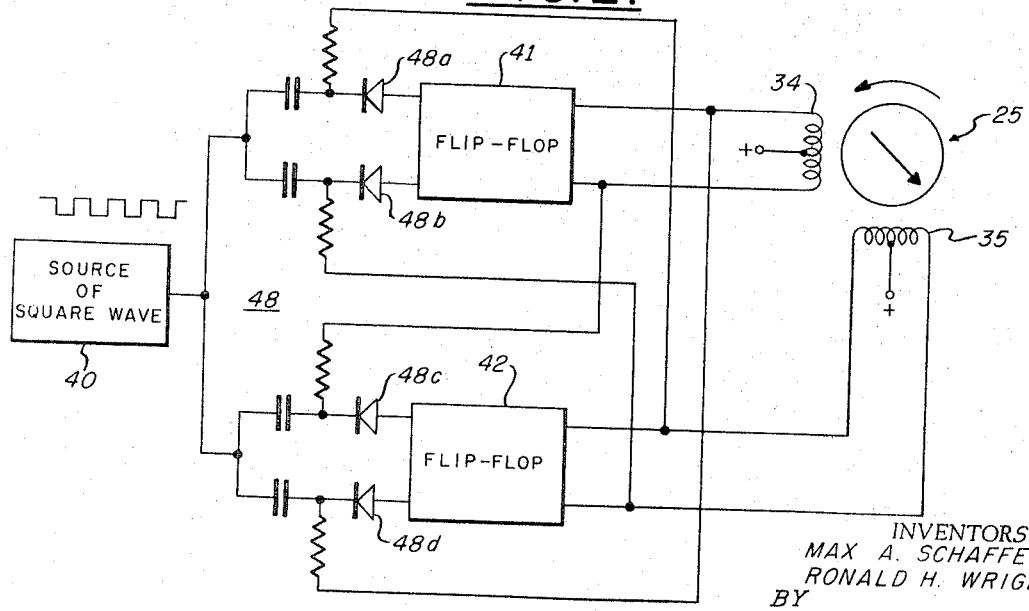
FIG.2.
FIG.3.
INVENTORS
MAX A. SCHAFFER
RONALD H. WRIGHT
BY
S.C.Seaton
ATTORNEY

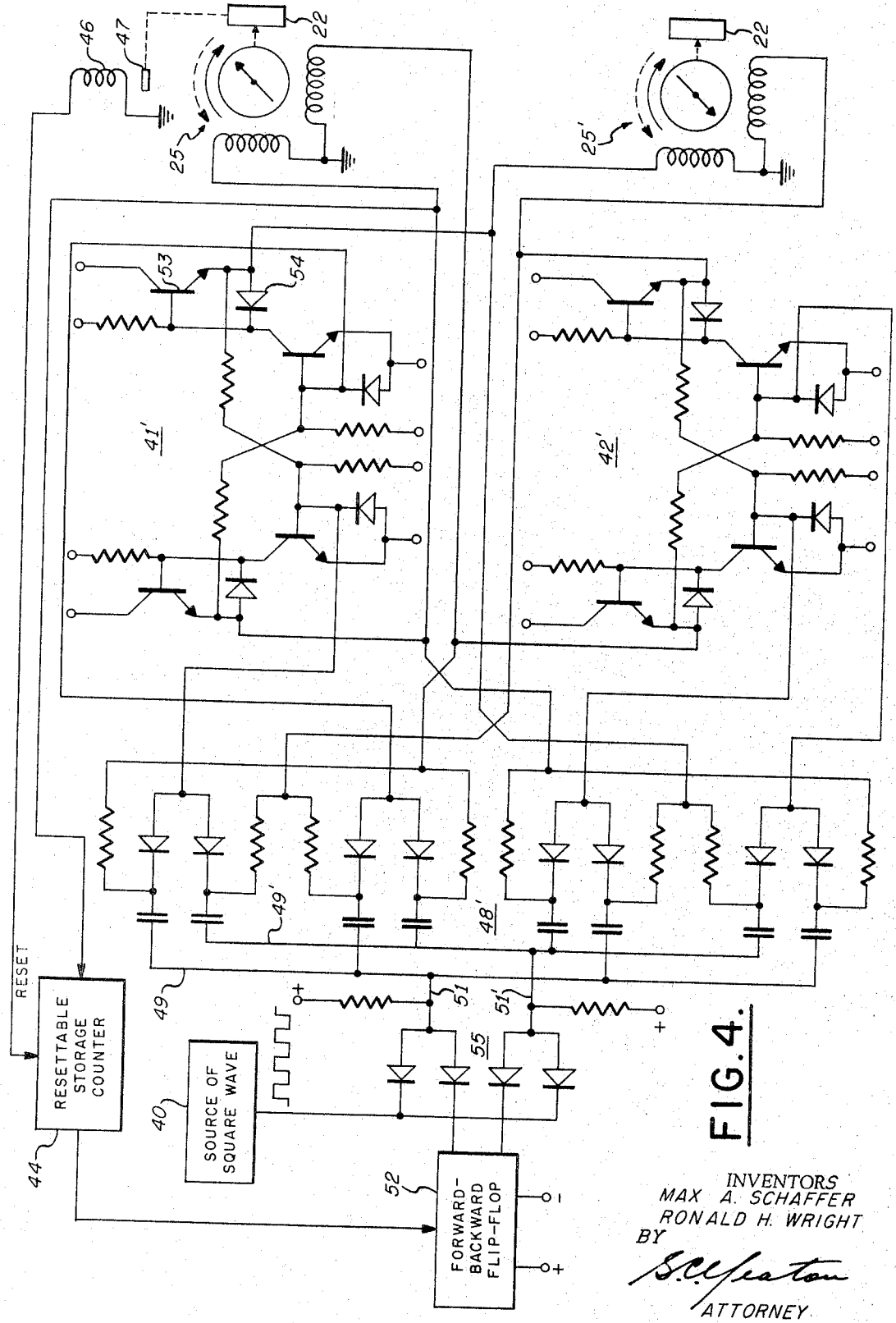

United States Patent Office 3,336,810
Patented Aug. 22, 1967

3,336,810
ANTIFRICTION SUPPORT MEANS FOR GYROSCOPES
Max A. Schaffer, Williston Park, and Ronald H. Wright, Commack, N.Y., assignors to Sperry Rand Corporation, Great Neck, N.Y., a corporation of Delaware
Filed Apr. 28, 1964, Ser. No. 363,245
6 Claims. (Cl. 74—5)

The present invention relates to improvements in antifriction bearing systems for supporting the sensitive elements of gyroscopic devices whereby to reduce the random drift characteristics of the gyroscope.

The antifriction bearings employed in the present invention are of the type shown in U.S. Patent No. 2,970,480 assigned to the same assignee as the present invention. As shown in this patent, the bearing suspensions for the gyroscopic sensitive element comprises ball bearings having an inner race, an outer race and at least one intermediate race which serves to support rolling members, such as balls, therebetween. As taught in the referenced patent, the random drift characteristics of the gyroscope are greatly improved by rotating the intermediate race of the gimbal support bearings one or more revolutions in opposite directions and reversing the directions of rotation a like number of revolutions whereby to tend to average out spurious torques produced by bearing run outs, such as minute irregularities in ball roundness, eccentricity of the bearing races and the like.

It has been found that an even further improvement in the reduction of the random drift characteristics of a gyro employing this type of bearing suspension can be achieved by very accurately controlling the rotation of the intermediate races so that the total angular rotation in each direction is precisely the same and that the point of reversal occurs at the same relative angular positions of the intermediate races and the fixed races.

In gyroscopes of the type disclosed in the aforementioned patent in which compound bearings are used to support the sensitive element about its precession axis or axes, the total angular rotation of the intermediate race in each direction could not accurately be controlled primarily because of the differences between the acceleration of the high speed servomotor in one direction or the other, the necessary large speed reduction gear train required between the motor and the intermediate race and possible differences in switching times of electromechanical switches. Because of these difficulties, the reversal point between the intermediate race and fixed races of the bearing would not remain constant but would tend to creep so that during a long run of the gyro the relative angular positions of the reversal points of the suspension bearings would continuously vary.

The gyro suspension bearings incorporating the teachings of the present invention overcome these problems by the use of a low speed synchronous motor of the multipolar, stepping type controlled from a low frequency supply and preferably in the form of pulses. The motor, which may be generally of the pancake type, is mounted directly on the gimbal in concentric relation with the gimbal trunnion thereby eliminating the need for high ratio step-down gearing. By accurately controlling the number and senses of the low frequency electric pulses supplied to the stepper motor, the total angular rotation of the motor in each direction and its point of reversal can be very accurately controlled. In a preferred embodiment of the invention, the stepper motor may be one having a multi-pole, two-phase stator adapted to drive or successively step a permanent magnet rotor having half the number of poles as the stator, the rotor being directly connected with the intermediate race of the antifriction bearing. A low frequency square wave supply voltage of a predetermined number of pulses per second is applied to the stepping motor stator through a control circuit comprising suitably gated flip-flops to thereby produce a synchronous speed of a related number of revolutions per minute. If desired, and in order to eliminate any starting effect, a suitable pickoff responsive to a specific angular position of the intermediate race may be employed to provide a starting reference. Alternatively, the angular pickoff itself may be employed to control the reversal of the pulse supply to the stepper motor.

As stated above, the intermediate race of the compound bearing is stepped from position to position by means of a low frequency square wave pulse supply. The frequency of the pulses and the distance between the poles of the motor together with the inertia of the motor rotor and intermediate race are so related that due to the magnetic spring effect between the rotor poles and the energized stator poles, a momentary oscillation of the intermediate race is provided. Thus, the combined effect of the accurately controlled stepped rotation of the intermediate race and the dither provided at each step of the rotation results in a greatly improved bearing suspension providing a gyroscope with significantly improved random drift characteristics.

It is therefore a primary object of the present invention to provide an improved gyroscope of the type in which the suspension bearings for the sensitive element thereof include an intermediate race and wherein the rotation thereof and its point of reversal are very accurately controlled.

It is a further object of the present invention to provide a gyro suspension bearing of the character described wherein the intermediate races are rotated in opposite directions and periodically reversed and wherein a stepper motor drive is integrally and concentrically mounted with respect to the gimbal suspension axis thereby eliminating the need for a high speed servomotor, step-down gearing and electromechical switches whereby to improve gyro performance while conserving space and reducing mechanical complexity.

It is still a further object of the present invention to provide gyro suspension bearings of the character described wherein the angular rotation of the stepper motor is provided by low frequency pulses, which pulses are controlled to produce a reversal of intermediate race rotation at precisely the same point for each reversal cycle.

It is also an object of the present invention to provide gyro suspension bearings of the type hereinabove described wherein the frequency of the supply pulses and the inertia of the intermediate race and stepped motor rotor are such that as the race and rotor are stepped from one angular position to another the magnetic spring effect between the rotor and stator produces a momentary oscillation of said race about each angular position of the rotor.

Other objects, features and advantages of the present invention not at this time particularly enumerated will become apparent as a detailed description of a preferred embodiment of the present invention proceeds, reference being made therein to the accompanying drawings wherein:

FIG. 1 is a plan view partially in section, of a two degree of freedom gyroscope embodying the novel bearing and drive means for both suspension or precession axes;

FIG. 2 is a block diagram of the electrical control arrangement for the stepper motor drive of the suspension bearings of the gyroscope of FIG. 1;

FIG. 3 is a schematic diagram of a circuit for controlling a stepper motor in accordance with a train of pulses; and FIG. 4 is a schematic diagram of a circuit for controlling a pair of stepper motors in accordance with teachings of the present invention.

Referring now to FIG. 1, there is shown a two degree of freedom gyroscope arranged as a vertical gyroscope and adapted primarily for use as one of the sensitive elements of a two-gyro stable platform. However, it will be understood that this particular configuration of the gyroscope is merely illustrative and it will, of course, be understood that other gyroscope configurations may embody the teachings of the present invention; for example, directional gyros, single degree of freedom gyros, and the like.

The gyroscope of FIG. 1 comprises generally a rotor 10 supported in a rotor case 11 for spinning about normally vertical spin axis 12. The rotor 10 and case 11 comprise the sensitive element of the gyro and is supported for rotation about its precession axes $r—r$ and $p—p$ (roll and pitch axes) by the usual gimbal, trunnions, and bearings. The rotor case 11 is mounted by means of trunnions 13, 13' in a normally horizontal gimbal ring 14 by means of compound ball bearing members 15, 15' for freedom about axis $r—r$. Gimbal ring 14 in turn is journalled on a support frame 16 by means of trunnions 17, 17' and similar compound antifriction ball bearings 18, 18' for freedom about axis $p—p$.

It will be noted that the support frame 16 is interiorly mounted with respect to the gimbal ring 14. In the specific embodiment disclosed, support member 16 forms a part of an external gimbal system for a multiple gyro stable platform.

Each of the four antifriction support bearings 15, 15', 18, 18' comprises an inner race 20, an outer race 21 and an intermediate race 22. A first set of rolling members or ball bearings 23 and a second paired set of ball bearings 24 are supported in rolling contact between the inner race 20 and intermediate race 22, and intermediate race 22 and outer race 21, respectively. Since all four bearings for supporting the sensitive element 11 of the vertical gyro about its precession axes are identical, reference characters have been applied only to a single bearing in the interest of clarity. However, it will be understood that this specific bearing arrangement is illustrative and that alternative arrangements may be employed. For example the number and arrangement of intermediate races and the arrangement of the ball complements may be varied to meet specific load or other requirements.

In accordance with the teachings of the present invention, the intermediate races of the antifriction bearing means are driven by a stepping motor indicated generally by reference character 25 having a stator member 26 and rotor member 27 carried directly on or forming an integral part of gimbal 14 and arranged concentrically with one of the gimbal support trunnions; in the present arrangement one of the pitch axis trunnions. It will be noted that the rotor member 27 of motor 25 is mounted directly on the intermediate race 22 and concentrically arranged with respect thereto so that there is provided a direct drive of the intermediate race thereby eliminating interconnecting speed reduction gearing. In the embodiment shown, any motion imparted to the intermediate race 22 is in turn imparted to each of the corresponding intermediate races of the other support bearings 18, 15 and 15' by means of intermeshing bevel gears 30, 31, 32 and 33. Of course, in some gyro gimbal arrangements it may not be possible or desirable to employ such interconnecting gearing and in such cases separate stepper motor drives in accordance with the teachings of the present invention may be provided for each bearing.

Referring now to FIG. 2, there is shown a block diagram of a circuit means for controlling the energization of the stepper motor 25. In accordance with the teachings of the present invention, this circuit provides for a low speed stepped rotation of the intermediate bearing races and further accurately controls the reversal point thereof. The motor 25, while shown schematically herein, comprises a two-phase stator and a multi-pole permanent magnet rotor as will be hereinafter more fully described. The control circuit comprises generally a source 40 of low frequency square wave pulses which are supplied to the two-phase rotor windings of the motor stator in the proper senses through a pair of flip-flops 41 and 42. The senses of the pulses required to produce the desired direction of rotation of the motor is provided by a logic circuit generally indicated at 43. After a predetermined number of revolutions of the motor, and hence the intermediate bearing race, the sense of the pulses supplied by the output of the switching logic circuit 43 and flip-flops 41 and 42 is reversed to thereby drive the intermediate race in the opposite direction. The point at which reversal occurs may be very accurately controlled simply by counting the pulses supplied to the motor. As shown in FIG. 2, the pulses supplied to one-phase winding of the motor 25 are counted by means of a conventional counter circuit 44 and after a predetermined number of pulses have been counted the state of the logic circuit 43 is reversed in a manner to accomplish the motor reversal as will be described below.

As stated above, it is desirable to ensure that the intermediate race of the bearings always traverse precisely the same angle in each direction of rotation. When the gyro is turned on, means are provided for initiating counter operation at a predetermined angular position of the intermediate races. This means comprises an angular position sensor 45 which may be located at a suitable point on the gyroscope. For example, as shown in FIG. 1, the sensor is mounted on the frame 16 and cooperates with the bevel gear 30. The sensor may comprise any suitable device for providing an electrical pulse when actuated by a cooperating element moved in accordance with the moment of the intermediate race 22. In the present embodiment there is illustrated an inductive pickoff 46 which supplies an output pulse every time a cooperating raised portion 47 of the gear 30 passes it. This pulse is fed to the counter 44 and serves to reset it to zero. If the intermediate race is to rotate more than one revolution, the pickoff may be disabled after the initial pulse. Alternatively, the pulses supplied by the angular position sensor 45 may be used to control the counter 44 directly instead of counting the pulses supplied to the motor. In this case, since there is one pulse per rotation of the intermediate race, it is only necessary to set the counter so that it provides an output pulse after the desired number of race rotations.

In order to facilitate an understanding of a preferred embodiment of the present invention, an example of a control circuit for controlling the stepper motor 25 for rotation in one direction only is illustrated in the schematic diagram of FIG. 3. The circuit comprises, as in FIG. 2, a pair of flip-flops 41 and 42 and a switching logic 48 which together form a conventional ring counter, which in turn is energized from the source of square wave pulses 40 of a single sense. In this illustrative circuit, the motor comprises a two-pole motor and two-phase stator, the two-phase windings 34 and 35 thereof have their center taps supplied from a suitable source of current and the states of the ring counter serve successively to step the motor 90° in a single direction for each pulse supplied by the square wave source.

Thus, assuming, as an initial condition produced by a prior negative pulse from supply 40, the upper portion of flip-flop 41 is on, the lower portion off, the upper portion of flip-flop 42 on and the lower portion off, current will flow through the upper portion of winding 34 and left hand portion of winding 35 respectively whereby the motor rotor takes the position shown. Under these conditions diode switch 48c will be back biased thereby blocking the upper portion of flip-flop 42. Similarly, the diode switch 48b will be back biased holding the lower portion of flip-flop 41 off. The next pulse supplied from source 40 will pass through diode switch 48a and turn the upper portion of flip-flop 41 off. However, since the diode switch 48c has been back biased, the upper portion of flip-flop 42 remains on and current still flows through the left portion of winding 35. The lower portion of flip-flop 41 is turned on whereby current will flow through the lower portion of winding 34 and the motor rotor rotates 90° in the direction of the arrow. Since the upper portion of flip-flop 41 is now off, diode switch 48d is back biased so that no change occurs in the lower portion of flip-flop 42. A similar operation occurs for each succesive pulse supplied from the source 40 and the motor rotor is thereby continuously stepped around in 90° increments.

As stated, the circuit of FIG. 3 does not provide for motor reversal and is shown for explanation purposes only. However, reversal may be accomplished in a number of ways; for example, by reversing the connections on the ring counter, reversing the connections of the motor windings, and the like. The reversal of the motor drive in a preferred embodiment is accomplished in a manner to provide additional advantages including a reduction in the number of electrical leads across the gimbal axes of a gyroscopic system and the ability to drive a pair of motors from a single circuit. The latter is advantageous in multiple gyro platforms where each gyro includes motor driven compound bearings of the type disclosed herein. This preferred circuit is illustrated in FIG. 4.

In FIG. 4, a pair of motors 25 and 25' are provided. As schematically illustrated, each comprises a two-phase stator and a two-pole motor as in FIG. 3. It will be noted that the control circuit is arranged differently, i.e. each stator phase has a common ground connection which may conveniently be tied directly to the grounded gyro thereby eliminating a number of slip rings otherwise required with the arrangement of FIG. 3. The senses of the pulses in the pulse trains supplied to the motor stators are controlled through a reversible ring counter comprising a pair of flip-flops 41', 42' and switching logic 48' so as to produce stepped rotation of the rotor in either direction in 90° steps per supply pulse. In one practical embodiment, the motor comprises a twenty-four pole two-phase stator and a twelve pole rotor. Therefore, for the same energization of the stator, the rotor is stepped around in one direction or the other in 15° steps per supply pulse. Furthermore, with such a motor configuration, twenty-four pulses (of the proper senses) produces one complete revolution of the motor. Also, in this embodiment the frequency or pulse repetition rate of the square wave supply is 12 p.p.s. thereby producing a synchronous speed of 30 r.p.m.

As mentioned, the circuit of FIG. 3 provides rotation of the motor 25 in only one direction from a source of pulses of a single phase since only a single ring counter is used. In the circuit of FIG. 4 a double, reversible ring counter is employed. The switching logic 48' comprises two sets of diode switches connected in parallel through leads 49, 49' with the square wave pulse source 40 and the direction of rotation of the motors 25, 25' is controlled by the flip-flops in accordance with which set of diodes is being energized from the source through upper lead 51 and lower lead 51'. The latter in turn is determined by the state of a forward-backward flip-flop 52 and conventional "and" gates 55. In FIG. 3 the output load for each section of flip-flops 41 and 42 constitutes one-half of each winding of the two-phase stator windings 34 and 35. It will be noted in FIG. 4 that the output load for each section of flip-flop 41' constitutes one phase of each motor 25, 25' and, similarly, the output loads for each section of flip-flop 42' constitute the other phase of each of the motors 25, 25'. The operation of the flip-flops 41' and 42' in response to pulses supplied by either set of diode switches of logic 48' is the same as to that of FIG. 3 and a further detailed description is deemed unnecessary. If the state of forward-backward flip-flop 52 is such as to supply a grounded state on upper lead 51, only the diode switch set connected with lead 49' is energized and the operation of the ring counter will be similar to that of FIG. 3 but producing rotation of the motor in the direction of the dashed arrow. Conversely, if the state of the "and" gates 55 is reversed, the operation of the ring counter again will be similar to that of FIG. 3 but resulting in rotation of the motor in the opposite sense as indicated by the solid arrow.

It should be noted that the outputs of each section of each flip-flop is not directly connected with its load but rather each output controls a transistor switch 53 which serves to switch current directly from the power supply to its respective load. In this manner the power output of the flip-flop is greatly increased.

In order to precisely reverse the operation of the motors 25, 25', a resettable storage counter 44 is provided and energized by the output pulses supplied to one of the phases of the motor 25. Inasmuch as a predetermined number of pulses are supplied for every revolution of the motor, the storage counter 44 may be designed to provide an output after any predetermined multiple thereof and thereupon supply a pulse to reverse the state of the forward-backward flip-flop 52. This reverses the states of "and" gates 55 and switches the supply between leads 51 and 51' to thereby energize the outer set of diodes switches in the logic 48'. The resettable storage counter 44 may be of any conventional type and may comprise a predetermined number of series connected flip-flops the number of stages being dependent upon the desired number of revolutions of the motors in each direction.

As stated in connection with FIG. 2, an inductive angular position pickoff 45 supplies a pulse at a specific angular position of the intermediate race to thereby reset the storage counter 44 to zero upon starting of the gyro.

In being stepped from position to position through the magnetic forces between the permanent magnet rotor poles with particular energized stator poles, the frequency and duration of the pulses together with the inertia of the rotor and its driven load is such that a momentary decaying oscillation occurs about each angular position. This oscillation is due to the magnetic spring effect between a rotor pole and an energized stator pole. This oscillation is a direct result of the stepper motor action and is superimposed on the stepped rotation of the motor thereby resulting in a greatly improved bearing inasmuch as it provides a dither effect which eliminates break-away torques in the stepping of the rotor from position to position.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Gyroscopic apparatus having bearing means supporting the sensitive element thereof for rotationable movement about a precession axis, said bearing means including inner and outer races and at least one intermediate race supporting rolling members therebetween, electromagnetic motive means coupled in driving relation with said intermediate race and adapted to rotate the same through discrete angles in response to discrete electrical pulses, and circuit means including a source of discrete electrical pulses coupled with said motive means for successively supplying first and second predetermined pluralities of said discrete electrical pulses to said motive means in senses to cause rotation of said motive means through a corresponding plurality of discrete angles in one direction or the opposite direction respectively through a total angle proportional to the total number of pulses in each of said first and second plurality of pulses.

2. Gyroscopic apparatus having bearing means supporting the sensitive element thereof for rotational movement about a precession axis, said bearing means including inner and outer races and at least one intermediate race supporting rolling members therebetween, electromagnetic motive means coupled in driving relation with said intermediate race and adapted to rotate the same through discrete angles in response to discrete electrical pulses, circuit means including a source of discrete electrical pulses connected with said motive means for supplying a first plurality of said discrete electrical pulses to said motive means in senses to cause rotation thereof in one direction through a corresponding plurality of discrete angles and for supplying a second plurality of said discrete pulses to said motive means in senses to cause rotation thereof in the opposite direction through a corresponding plurality of discrete angles, and means responsive to the excitation of said motive means for alternately supplying said first and second plurality of pulses to said motive means.

3. Apparatus as set forth in claim 2 wherein said last-mentioned means includes counter means responsive to a predetermined number of pulses of each of said plurality of pulses supplied to said motive means.

4. Apparatus as set forth in claim 3 wherein said last-mentioned means further includes means responsive to a predetermined angular position of said motive means for controlling said counter means.

5. In a gyroscopic device,
(a) bearing means for supporting the sensitive element of said device for rotation about a precession axis thereof including inner and outer bearing races and at least one intermediate bearing race for supporting a plurality of rolling bearing elements,
(b) a stepper motor including multi-polar rotor and stator members concentrically mounted on said axis and having its rotor member directly coupled with said intermediate race for directly imparting rotary motion thereto, one of said motor members including windings and being adapted when energized to produce a magnetic alignment between the poles of said rotor and stator members,
(c) a source of square wave pulses,
(d) circuit means responsive to said source for successively supplying first and second chains of square wave pulses to said one motor member in senses to produce a stepped rotation of said race in one direction and the other respectively, the frequency of said pulses and the inertia of said intermediate race and rotor member being such that in being stepped from one angular position to another the magnetic spring effect between said motor members produces a momentary oscillation of said race about each of said angular positions, whereby to provide not only a stepped rotation of said intermediate race in one direction and the other but also a dither of said intermediate race at each step of said rotation.

6. Gyroscopic apparatus having bearing means supporting the sensitive element thereof for rotational movement about a precession axis, said bearing means including inner and outer races and at least one intermediate race supporting rolling members therebetween,
(a) a stepper motor coupled in driving relation with said intermediate race and adapted to rotate the same through a discrete angle in response to discrete electrical pulses supplied thereto,
(b) a source of electrical pulses,
(c) a first circuit adapted to have its input connected with said source and having its output connected with said motor for converting said source pulses into a first plurality of pulses having senses such as to produce a rotation of said motor in a one direction through a corresponding number of discrete steps,
(d) a second circuit also adapted to have its input connected with said source and its output connected with said motive means for converting said source pulses into a second plurality of pulses having senses such as to produce rotation of said motor in the opposite direction through a corresponding number of discrete steps,
(e) and a third circuit means controlled by the output of one of said first and second circuit means for successively switching the said source of pulses from said first circuit to said second circuit each time a predetermined plurality of pulses have been supplied thereby.

References Cited
UNITED STATES PATENTS
2,970,480  2/1961  Zeigler et al. _____ 74—5
3,200,652  8/1965  Chaggaris _____ 74—5

FOREIGN PATENTS
1,256,107  2/1961  France.

FRED C. MATTERN, JR., *Primary Examiner.*

BROUGHTON G. DURHAM, *Examiner.*

T. W. SHEAR, C. J. HUSAR, *Assistant Examiners.*